_# 3,112,307
DERIVATIVES OF BENZOTHIADIAZINE
1,1-DIOXIDE

Moses Wolf Goldberg, Upper Montclair, and Hanns H. Lehr, Montclair, N.J., and Marcel Muller, Reinach, Basel-Land, Switzerland, assignors to Hoffmann-La Roche Inc., Nutley, N.J., a corporation of New Jersey
No Drawing. Filed June 15, 1960, Ser. No. 36,166
9 Claims. (Cl. 260—243)

This invention relates to novel sulfohydroxamic acid derivatives represented by the following formulae:

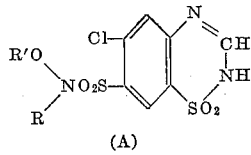

(A)

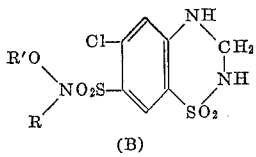

(B)

and their non-toxic salts, as well as processes to make the above compounds. In the above formulae, R represents a member of the group consisting of hydrogen and lower alkyl and R' represents a member of the group consisting of hydrogen, lower alkyl, lower alkenyl, lower alkynyl, carboxy-lower alkyl and carbo-lower alkoxy-lower alkyl.

In the above formulae the symbols R and R' represent various groups which are or contain hydrocarbon radicals. These hydrocarbon radicals may be straight or branched chain groups. The lower alkyl groups include for example methyl, ethyl, propyl, isopropyl, butyl, sec.-butyl, tert.-butyl, amyl and the like. The lower alkyl radicals occurring in the carboxy-lower alkyl and carbo-lower alkoxy-lower alkyl groups are radicals of the same character. The lower alkenyl groups include such radicals as allyl, crotyl, etc. Propargyl, butynyl and the like are illustrative of the lower alkynyl group. Preferred among the lower alkyl, lower alkenyl and lower alkynyl groups, respectively, are the methyl, ethyl, propyl, isopropyl, allyl and the propargyl groups. Carboxymethyl is another preferred substituent represented by R'.

The compounds of Formulae A and B and their non-toxic salts are useful therapeutic agents and are particularly useful for their diuretic and/or natriuretic properties. The compounds having those formulae or pharmaceutically acceptable salts thereof can be administered in conventional therapeutic dosage forms and are, for example, useful and effective when administered orally. When a soluble form for administration by other than the oral route is required, it is frequently desirable to convert the compound of Formula A or B into a soluble salt as more particularly described below.

The novel compounds of this invention can be made from the known material 2-nitro-4-chlorobenzenesulfon-amide. Upon catalytic hydrogenation, e.g. with Raney nickel, this yields 2-amino-4-chlorobenzenesulfonamide. Ring closure of 2-amino-4-chlorobenzenesulfonamide with formic acid produces 6-chloro-2H-1,2,4-benzothiadiazine 1,1-dioxide (C)

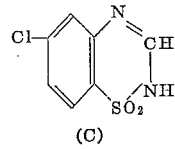

which upon treatment with chlorosulfonic acid gives 6-chloro-2H-1,2,4-benzothiadiazine-7-sulfonyl chloride 1,1-dioxide (D).

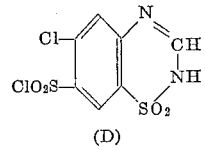

Compound D may also be produced by reacting 6-chloro-2H-1,2,4 - benzothiadiazine-7-sulfonamide 1,1-dioxide with chlorosulfonic acid.

The sulfochloride (D) is a useful intermediate from which the compounds represented by the general Formula A are obtained by condensing with a hydroxylamine of the formula

in which R and R' have the significance described previously. In addition to hydroxylamine itself, derivatives such as methoxyamine, ethoxyamine, propoxyamine, allyloxyamine, propargyloxyamine, O,N - dimethylhydroxylamine, O,N-diethylhydroxylamine, aminoxyacetic acid, α-aminoxypropionic acid, α-aminoxybutyric acid, etc., are illustrative of the reactants which may be used. Preferably the reaction is carried out in a basic medium such as pyridine, aqueous alkali metal hydroxide, for example, sodium hydroxide, etc., at about room temperature, using a crystalline salt of the selected hydroxylamine, e.g. an acid salt such as a hydrohalide, especially the hydrochloride. The free hydroxylamine in a neutral solvent such as ethanol or benzene may also be used. When R' is a carboxy-lower alkyl group, reaction with a lower alkanol such as methanol or ethanol in the presence of an esterifying catalyst such as a mineral acid will convert the compound to the carbo-lower alkoxy-lower alkyl derivative.

The new compounds of Formula A give upon reduction, the corresponding compounds of Formula B. A preferred method comprises reducing the compound of Formula A with a complex metal hydride, e.g. an alkali metal hydride such as sodium borohydride. An alternate method comprises cleaving the thiadiazine ring of the compounds of Formula A with aqueous alkali to obtain a 2-chloro-4-amino-5-sulfamyl-O-substituted-benzenesulfo-hydroxamic acid and then again closing the ring with formaldehyde to obtain the compounds of Formula B.

The compounds of Formulae A and B form salts with basic agents such as alkalis, e.g. alkali metal hydroxides, such as sodium hydroxide, and other non-toxic bases, e.g. organic bases such as diethanolamine. This may be accomplished by dissolving the compound having either Formula A or Formula B in an aqueous solution of the base. The salts are soluble in water and such solutions may be used for parenteral administration.

Within the class of compounds represented by Formulae A and B, those wherein R represents hydrogen constitute a preferred group. Especially preferred compounds are those represented by Formula B in which R represents hydrogen.

The instant application is a continuation-in-part of Serial No. 831,941, filed August 6, 1959, and now abandoned.

The following examples are illustrative of the invention. All melting points are corrected.

EXAMPLE 1

*2-Amino-4-Chlorobenzenesulfonamide*

100 g. (0.42 mol) 2-nitro-4-chlorobenzenesulfonamide was dissolved in 1 liter ethanol. The solution was hydrogenated with Raney-Ni as catalyst at an approximate hydrogen pressure of 700 lbs./sq. in. at 50–60° C. until 1.25 mols of hydrogen were taken up. The catalyst was filtered off. The filtrate was evaporated to dryness and the residue recrystallized from ethanol. 2-amino-4-chlorobenzenesulfonamide was obtained as white crystals melting at 141–142° C.

EXAMPLE 2

*6-Chloro-2H-1,2,4-Benzothiadiazine 1,1-Dioxide*

60 g. 2-amino-4-chlorobenzenesulfonamide was dissolved in 500 cc. formic acid (98–100%). The solution was heated on the steam bath for 4 hours. On chilling, white crystals were obtained, which were filtered off, washed with water, and dried in vacuo at 60°. 6-chloro-2H-1,2,4-benzothiadiazine 1,1-dioxide melted at 258–259° C.

EXAMPLE 3

*6-Chloro-2H-1,2,4-Benzothiadiazine-7-Sulfonyl Chloride 1,1-Dioxide*

*Method I.*—5 g. 6-chloro-2H-1,2,4-benzothiadiazine 1,1-dioxide was added to 35 cc. chlorosulfonic acid, and the mixture was heated to 150–160° for 24 hours. The cooled solution was poured on ice, the white precipitate was filtered off, washed thoroughly with water and dried in vacuo at 60°. After recrystallization from acetone-water, 6-chloro-2H-1,2,4-benzothiadiazine-7-sulfonyl chloride 1,1 dioxide was obtained as white needles melting at 257–258° C. (dec.).

*Method II.*—100 g. 6-chloro-2H-1,2,4-benzothiadiazine in 7-sulfonamide 1,1-dioxide was added to 900 cc. chlorosulfonic acid, and the mixture was heated to 130° C. for 5 hours. The cooled solution was poured on ice, the white precipitate was filtered off, washed thoroughly with water, and dried in vacuo at 60°. After recrystallization from acetone-water, the 6-chloro-2H-1,2,4-benzothiadiazine-7-sulfonyl chloride 1,1-dioxide melted at 257–258° C. (dec.).

EXAMPLE 4

*6-Chloro-2H-1,2,4-Benzothiadiazine-7-Sulfohydroxamic Acid 1,1-Dioxide*

To a solution of 11.25 g. hydroxylamine hydrochloride in 120 cc. of pyridine was added in portions 15 g. of 6-chloro-2H-1,2,4-benzothiadiazine-7-sulfonyl chloride 1,1-dioxide, and the mixture was stirred overnight at room temperature. The solution was added to 1 liter of water and chilled for 4 hours. The crystals that formed were filtered off, washed with water and air-dried. After recrystallization from ethanol-petroleum ether, the 6-chloro-2H-1,2,4-benzothiadiazine-7-sulfohydroxamic acid 1,1-dioxide melted at 235–237° C. (dec.).

EXAMPLE 5

*6-Chloro-O-Methyl-2H-1,2,4-Benzothiadiazine-7-Sulfohydroxamic Acid 1,1-Dioxide*

To a solution of 14.8 g. methoxyamine hydrochloride in 250 cc. pyridine was added in portions 22 g. of 6-chloro-2H-1,2,4-benzothiadiazine-7-sulfonyl chloride 1,1-dioxide, and the mixture was stirred overnight at room temperature. The solution was added slowly to 750 cc. of 10% hydrochloric acid under cooling. After standing for 2 hours in an ice-bath, the crystalline precipitate was filtered off, washed with water and air-dried. After recrystallization from ethanol-water, the 6-chloro-O-methyl-2H-1,2,4-benzothiadiazine-7-sulfohydroxamic acid 1,1-dioxide melted at 244–245° C. (dec.).

The bis-(diethanolamine)salt of 6-chloro-O-methyl-2H-1,2,4-benzothiadiazine-7-sulfohydroxamic acid 1,1-dioxide was obtained by dissolving 3.26 g. of the above compound in 40 cc. of water containing 2.1 g. of diethanolamine.

EXAMPLE 6

*6-Chloro-O-Ethyl-2H-1,2,4-Benzothiadiazine-7-Sulfohydroxamic Acid 1,1-Dioxide*

To a solution of 5.8 g. ethoxyamine in 100 cc. pyridine was added 15 g. of 6-chloro-2H-1,2,4-benzothiadiazine-7-sulfonyl chloride 1,1-dioxide, and the mixture was stirred overnight in room temperature. The solution was added to 200 cc. of 10% hydrochloric acid under cooling. After chilling for 2 hours, the crystalline precipitate was filtered off, washed with water and air-dried. After recrystallization from ethanol-water, the 6-chloro-O-ethyl-2H-1,2,4-benzothiadiazine-7-sulfohydroxamic acid 1,1-dioxide melted at 234–235° C. (dec.).

EXAMPLE 7

*6-Chloro-O-Propyl-2H-1,2,4-Benzothiadiazine-7-Sulfonhydroxamic Acid 1,1-Dioxide*

To a solution of 14.2 g. propoxyamine hydrochloride in 250 cc. pyridine was added 20 g. of 6-chloro-2H-1,2,4-benzothiadiazine-7-sulfonyl chloride 1,1-dioxide, and the mixture was stirred overnight at room temperature. The solution was added to 500 cc. of 10% hydrochloric acid. After chilling for several hours, the crystalline precipitate was filtered off, washed with water and air-dried. Recrystallization from ethanol-water gave 6-chloro-O-propyl-2H-1,2,4-benzothiadiazine-7-sulfohydroxamic acid, 1,1-dioxide in form of white crystals, M.P. 242–243° C. (dec.).

EXAMPLE 8

*6-Chloro-O-Allyl-2H-1,2,4-Benzothiadiazine-7-Sulfohydroxamic Acid 1,1-Dioxide*

To a solution of 13.9 g. allyloxyamine hydrochloride in 250 cc. of pyridine was added 20 g. of 6-chloro-2H-1,2,4-benzothiadiazine-7-sulfonyl chloride 1,1-dioxide, and the mixture was stirred overnight at room temperature. The solution was added to 500 cc. of 10% hydrochloric acid. After chilling for several hours, the crystalline precipitate was filtered off, washed with water and air-dried. Recrystallization from ethanol-water gave 6-chloro-O-allyl-2H-1,2,4-benzothiadiazine-7-sulfohydroxamic acid 1,1-dioxide in form of white crystals, M.P. 215–217° C. (dec.).

EXAMPLE 9

*6-Chloro-O-Propargyl-2H-1,2,4-Benzothiadiazine-7-Sulfohydroxamic Acid 1,1-Dioxide*

400 g. of potassium hydroxylamine disulfonate was dissolved in 2.1 liters of water containing 125 g. potassium hydroxide. 268 g. of propargylbromide was dropped into this solution with stirring at room temperature. When all propargylbromide had been added, the mixture was heated to 60° C. for half an hour. It was then concentrated in vacuo almost to dryness. Two liters of 20% hydrochloric acid was added, and the solution heated on the steam bath for half an hour. It was then concentrated in vacuo to half of its original volume, and made alkaline by addition of 750 ml. 40% sodium hydroxide with stirring and outside cooling. The mixture was extracted four times with ether, and the combined ether extracts were dried with sodium sulfate. Hydrochloric acid gas was then bubbled through the ether solution. The precipitated O-propargyl hydroxylamine hydrochloride was filtered off and recrystallized from ethanol-ether. It melted at 162° with decomposition.

To a solution of 13.7 g. of propargyloxyamine hydrochloride in 250 cc. of pyridine was added 20 g. of 6-chloro-2H-1,2,4-benzothiadiazine-7-sulfonyl chloride 1,1-dioxide, and the mixture was stirred at room temperature overnight. The solution was added to 500 cc. of 10% hydrochloric acid. After chilling for several hours, the crystalline precipitate was filtered off, washed with water and air-dried. Recrystallization from ethanol-water gave 6-chloro-O-propargyl-2H-1,2,4-benzothiadiazine-7-sulfohydroxamic acid 1,1-dioxide in form of white crystals, M.P. 209–211° C. (dec.).

EXAMPLE 10

*6-Chloro-3,4-Dihydro-O-Methyl-2H-1,2,4-Benzothiadiazine-7-Sulfohydroxamic Acid 1,1-Dioxide*

22 g. of 6-chloro-O-methyl-2H-1,2,4-benzothiadiazine-7-sulfohydroxamic acid 1,1-dioxide was dissolved in 130 cc. 1 N sodium hydroxide. To this sodium salt solution was added 260 cc. of water. To the cooled and stirred solution was then added in portions 11 g. sodium borohydride. After letting the mixture stand overnight at room temperature, 200 cc. of 2 N hydrochloric acid was added under stirring and cooling to neutralize the sodium salt of the reduced compound. A white precipitate formed, which was filtered off, washed with water, and recrystallized from acetone-water. The 6-chloro-3,4-dihydro-O-methyl-2H-1,2,4 - benzothiadiazine-7-sulfohydroxamic acid 1,1-dioxide thus obtained melted at 217–219° C. (dec.).

EXAMPLE 11

*6-Chloro-3,4-Dihydro-O-Ethyl-2H-1,2,4-Benzothiadiazine-7-Sulfohydroxamic Acid 1,1-Dioxide*

3.4 g. of 6-chloro-O-ethyl-2H-1,2,4-benzothiadiazine-7-sulfohydroxamic acid 1,1-dioxide was dissolved in 60 cc. 0.33 N sodium hydroxide. To this sodium salt solution was added with stirring 1.7 g. sodium borohydride. The solution was kept at room temperature overnight. It was then dropped into an ice-cooled, well stirred solution of 50 cc. of 2 N hydrochloric acid to neutralize the sodium salt. A white precipitate formed, which was filtered off, washed with water and recrystallized from ethanol-water. 6-chloro-3,4 - dihydro-O-ethyl - 2H-1,2,4-benzothiadiazine-7-sulfohydroxamic acid 1,1-dioxide of M.P. 188–189° C. (dec.) was obtained.

EXAMPLE 12

*6-Chloro-3,4-Dihydro-O-Propyl-2H-1,2,4-Benzothiadiazine-7-Sulfohydroxamic Acid 1,1-Dioxide*

10.5 g. of 6-chloro-O-propyl-2H-1,2,4-benzothiadiazine-7-sulfohydroxamic acid 1,1-dioxide was dissolved in 180 cc. 0.33 N sodium hydroxide. 5 g. sodium borohydride was added to this solution of the sodium salt with stirring. The solution was kept at room temperature overnight, and then dropped into a well stirred, ice-cooled solution of 150 cc. of 2 N hydrochloric acid. The 6-chloro-3,4-dihydro-O-propyl - 2H-1,2,4-benzothiadiazine-7-sulfohydroxamic acid 1,1-dioxide precipitated as a white solid, which was filtered off and was recrystallized from ethanol-water, giving white platelets melting at 195–197° C. (dec.).

EXAMPLE 13

*6-Chloro-3,4-Dihydro-O-Allyl-2H-1,2,4-Benzothiadiazine-7-Sulfohydroxamic Acid 1,1-Dioxide*

7.0 g. of 6-chloro-O-allyl-2H - 1,2,4-benzothiadiazine-7-sulfohydroxamic acid 1,1-dioxide was dissolved in 120 cc. 0.33 N sodium hydroxide. To this sodium salt solution was added 3.5 g. sodium borohydride with stirring. The solution was kept at room temperature overnight, and then dropped into a well stirred, ice-cooled solution of 100 cc. of 2 N hydrochloric acid to neutralize the sodium salt of the reduced product. A white precipitate formed, which was filtered off and recrystallized from acetone-water. 6 - chloro-3,4 - dihydro-O-allyl-2H-1,2,4-benzothiadiazine-7 - sulfohydroxamic acid 1,1-dioxide, was obtained in the form of white needles, M.P. 164–165° C.

EXAMPLE 14

*6-Chloro-3,4-Dihydro-O-Propargyl-2H-1,2,4-Benzothiadiazine-7-Sulfohydroxamic Acid 1,1-Dioxide*

3.5 g. of 6-chloro-O-propargyl-2H-1,2,4-benzothiadiazine-7-sulfohydroxamic acid 1,1-dioxide was dissolved in 60 cc. cold 0.33 N sodium hydroxide. To this sodium salt solution was added 1.7 g. sodium borohydride with stirring and cooling. The solution was kept at room temperature overnight, and was then dropped into an ice-cooled, stirred solution of 50 ml. of 2 N hydrochloric acid to neutralize the sodium salt. A white precipitate formed, which was filtered off and recrystallized from ethanol-water. 6-chloro-3,4-dihydro-O-propargyl-2H-1, 2,4-benzothiadiazine-7-sulfohydroxamic acid 1,1-dioxide was obtained in the form of a white powder, decomposing at 150–160° C.

EXAMPLE 15

*6-Chloro-O,N-Dimethyl-2H-1,2,4-Benzothiadiazine-7-Sulfohydroxamic Acid 1,1-Dioxide*

7.7 g. of O,N-dimethylhydroxylamine hydrochloride was dissolved in 110 cc. pyridine. To this solution was added with stirring 15.8 g. of 6-chloro-2H-1,2,4-benzothiadiazine-7-sulfonyl chloride 1,1-dioxide. The solution was kept at room temperature overnight. It was then dropped into about 400 cc. of 10% hydrochloric acid. A light yellow precipitate formed, which was filtered off and was recrystallized from acetone-water. The colorless 6-chloro-O,N-dimethyl - 2H-1,2,4 - benzothiadiazine-7-sulfohydroxamic acid 1,1-dioxide thus obtained melted at 247–248° C. (dec.).

EXAMPLE 16

*6-Chloro-3,4-Dihydro-O,N-Dimethyl-2H-1,2,4-Benzothiadiazine-7-Sulfohydroxamic Acid 1,1-Dioxide*

5 g. of 6-chloro-O,N-dimethyl-2H-1,2,4-benzothiadiazine-7-sulfohydroxamic acid 1,1-dioxide was dissolved in 45 cc. 0.33 N sodium hydroxide. 2.5 g. sodium borohydride was added to this sodium salt solution with stirring, and the solution was kept at room temperature overnight. It was then dropped into an ice-cooled, well stirred solution of 100 cc. of 2 N hydrochloric acid to neutralize the salt and precipitate the product. A white precipitate formed, which was filtered off and was recrystallized from ethanol-water. 6-chloro-3,4-dihydro-O,N-dimethyl-2H-1,2,4-benzothiadiazine - 7 - sulfohydroxamic acid 1,1-dioxide was obtained in the form of white needles melting at 167–168° C.

EXAMPLE 17

*6-Chloro-O,N-Diethyl-2H-1,2,4-Benzothiadiazine-7-Sulfohydroxamic Acid 1,1-Dioxide*

10 g. of O,N-diethylhydroxylamine hydrochloride was dissolved in 130 cc. pyridine. To this solution was added with stirring 15.8 g. of 6-chloro-2H-1,2,4-benzothiadiazine-7-sulfonyl chloride 1,1-dioxide. The solution was kept at room temperature overnight, and was then dropped into about 400 cc. of 10% hydrochloric acid. A precipitate formed, which was filtered off, and was recrystallized from acetone-water 6-chloro-O,N-diethyl-2H-1,2,4-benzothiadiazine-7-sulfohydroxamic acid 1,1-dioxide, was obtained in the form of white crystals, M.P. 235–236° C.

EXAMPLE 18

*6-Chloro-3,4-Dihydro-O,N-Diethyl-2H-1,2,4-Benzothiadiazine-7-Sulfohydroxamic Acid 1,1-Dioxide*

5.5 g. of 6-chloro-O,N-diethyl-2H-1,2,4-benzothiadiazine-7-sulfohydroxamic acid 1,1-dioxide was dissolved in 45 cc. 0.33 N sodium hydroxide. 2.5 g. sodium borohydride was added with stirring and the sodium salt solution kept at room temperature overnight. It was then dropped into an ice-cooled and stirred solution of 100 cc. 2 N hydrochloric acid. A white precipitate formed, which was filtered off and was recrystallized from ethanol-water. 6-chloro - 3,4 - dihydro-O,N-diethyl-2H-1,2,4-benzothiadiazine-7-sulfohydroxamic acid 1,1-dioxide was obtained in the form of white crystals, M.P. 209–210° C.

EXAMPLE 19

*6-Chloro-O-Carboxymethyl-2H-1,2,4-Benzothiadiazine-7-Sulfohydroxamic Acid 1,1-Dioxide*

Method I.—9.5 g. of 6-chloro-7-chlorosulfonyl-2H-1,2,4-benzothiadiazine 1,1-dioxide and 3.9 g. of aminoxyacetic acid hemihydrochloride were suspended in 75 cc. of water. To the stirred suspension was added dropwise and with ice-cooling 100 cc. of 1 N sodium hydroxide in about 20 minutes. The mixture was stirred for 1 hour at room temperature, and poured into excess ice-cold hydrochloric acid (1:3) to neutralize the sodium salt and precipitate the product. The white precipitate, 6-chloro-O-carboxymethyl-2H-1,2,4-benzothiadiazine - 7 - sulfohydroxamic acid 1,1-dioxide, was filtered off and recrystallized from acetone-water, M.P. 245–246° C. (dec.).

Method II.—20 g. of 6-chloro-7-chlorosulfonyl-2H-1,2,4-benzothiadiazine 1,1-dioxide and 9.4 g. aminoxyacetic acid hemihydrochloride were suspended in 100 cc. of pyridine and the mixture stirred overnight at room temperature. The clear solution was evaporated to dryness. The residue was dissolved in 200 cc. of hydrochloric acid (1:3) and the solution stirred for 3 to 4 hours. A heavy precipitate was formed which was filtered off, washed with water and dried in vacuo. After recrystallization from acetone-water, the product melted at 245–246° C. (dec.).

The bis-(diethanolamine)salt of 6-chloro-O-carboxymethyl-2H-1,2,4-benzothiadiazine-7-sulfohydroxamic acid 1,1-dioxide was obtained by dissolving 3.7 g. of the above compound in 40 cc. of water containing 2.1 g. of diethanolamine.

EXAMPLE 20

*6-Chloro-O-Carboxymethyl-3,4-Dihydro-2H-1,2,4-Benzothiadiazine-7-Sulfohydroxamic Acid 1,1-Dioxide*

To a suspension of 15.8 g. of 6-chloro-O-carboxymethyl-2H-1,2,4-benzothiadiazine - 7 - sulfohydroxamic acid 1,1-dioxide in 68 cc. of 1 N sodium hydroxide was added, with stirring, 8 g. of sodium borohydride in portions. During the addition, the reaction mixture was cooled occasionally with ice-water, so that the temperature was kept between 40 and 50°. After standing overnight at room temperature, the mixture containing the sodium salt of the product was added slowly to 80 cc. of hydrochloric acid (1:3) with cooling and stirring. After the addition was completed, the mixture was stirred in the cooling bath for 2 hours. The white precipitate, 6-chloro-O-carboxymethyl-3,4-dihydro-2H-1,2,4-benzothiadiazine-7-sulfohydroxamic acid 1,1-dioxide, was filtered off, washed with water and dried in vacuo. After recrystallization from acetone-water, the M.P. was 202–203° C. (dec.).

The bis-(diethanolamine)salt of 6-chloro-O-carboxymethyl-3,4-dihydro-2H-1,2,4-benzothiadiazine - 7 - sulfohydroxamic acid 1,1-dioxide was obtained by dissolving 3.72 g. of the above compound in 40 cc. of water containing 2.1 g. of diethanolamine.

EXAMPLE 21

*6-Chloro-O-(1-Carboxyethyl)-2H-1,2,4-Benzothiadiazine-7-Sulfohydroxamic Acid 1,1-Dioxide*

3.2 g. of 6-chloro-7-chlorosulfonyl-2H-1,2,4-benzothiadiazine 1,1-dioxide and 1.55 g. of α-aminoxypropionic acid hydrochloride were suspended in 20 cc. of water. To the suspension was added dropwise, with stirring and ice-cooling, 40 cc. of 1 N sodium hydroxide. The mixture was stirred 1 hour at room temperature and poured on 25 cc. ice-cold 2 N hydrochloric acid for neutralization of the sodium salt. The white precipitate was filtered off and recrystallized from acetone-water. The product, 6-chloro - O - (1-carboxyethyl)-2H-1,2,4-benzothiadiazine-7-sulfohydroxamic acid 1,1-dioxide, melted at 265–266° C. (dec.).

EXAMPLE 22

*6 - Chloro - O - (1 - Carboxyethyl) - 3,4 - Dihydro - 2H - 1,2,4 - Benzothiadiazine - 7 - Sulfohydroxamic Acid 1,1-Dioxide*

4 g. of 6-chloro-O-(1-carboxyethyl)-2H-1,2,4-benzothiadiazine-7-sulfohydroxamic acid 1,1-dioxide was dissolved in 18 cc. of 1 N sodium hydroxide to form a solution of the sodium salt. To the solution was added in portions 2 g. of sodium borohydride. After standing overnight at room temperature, the mixture was poured into excess ice-cooled 2 N hydrochloric acid to neutralize the sodium salt of the reduced product. The white precipitate, 6-chloro-O-(1-carboxyethyl) - 3,4 - dihydro - 2H-1,2,4-benzothiadiazine-7-sulfohydroxamic acid 1,1-dioxide, was filtered off and recrystallized from acetone-water, M.P. 229–230° C. (dec.).

EXAMPLE 23

*6 - Chloro - O - (1 - Carboxypropyl) - 2H - 1,2,4 - Benzothiadiazine-7-Sulfohydroxamic Acid 1,1-Dioxide*

6.4 g. of 6-chloro-7-chlorosulfonyl-2H-1,2,4-benzothiadiazine 1,1-dioxide and 3.4 g. of α-aminoxybutyric acid hydrochloride were suspended in 40 cc. of water. To the suspension was added dropwise, with stirring and ice-cooling, 80 cc. of 1 N sodium hydroxide. The mixture was stirred at room temperature for 1 hour and then poured on 50 cc. of ice-cold 2 N hydrochloric acid to neutralize the salt and precipitate the product. The white precipitate, 6 - chloro - O - (1 - carboxypropyl) - 2H-1,2,4-benzothiadiazine-7-sulfohydroxamic acid 1,1 - dioxide, was filtered off and recrystallized from acetone-water, M.P. 264–265° C. (dec.).

EXAMPLE 24

*6 - Chloro - O - (1 - Carboxypropyl) - 3,4 - Dihydro - 2H - 1,2,4 - Benzothiadiazine - 7 - Sulfohydroxamic Acid 1,1-Dioxide*

5.5 g. of 6-chloro-O-(1-carboxypropyl)-2H-1,2,4-benzothiadiazine-7-sulfohydroxamic acid 1,1-dioxide was dissolved in 25 cc. of 1 N sodium hydroxide. The sodium salt solution was diluted with 15 cc. of water, and 3 g. of sodium borohydride was added in portions. After standing overnight at room temperature, the mixture was poured into excess ice-cold 2 N hydrochloric acid. The white precipitate, 6 - chloro - O - (1 - carboxypropyl)-3,4 - dihydro - 2H - 1,2,4 - benzothiadiazine - 7 - sulfohydroxamic acid 1,1-dioxide, was filtered off and recrystallized from acetone-water, M.P. 254–255° C. (dec.).

EXAMPLE 25

*6 - Chloro-O-Carbomethoxymethyl - 2H - 1,2,4 - Benzothiadiazine-7-Sulfohydroxamic Acid 1,1-Dioxide*

3 g. of 6-chloro-O-carboxymethyl-2H-1,2,4-benzothiadiazine-7-sulfohydroxamic acid 1,1-dioxide was dissolved in 5 cc. dimethylformamide. To the solution was added 45 cc. of methanol saturated with hydrogen chloride, and the mixture was kept at 0° overnight. The crystals of 6 - chloro - O - carbomethoxymethyl - 2H - 1,2,4 - benzothiadiazine-7-sulfohydroxamic acid 1,1-dioxide that separated were filtered off and recrystallized from acetone-water, M.P. 251–252° C. (dec.).

EXAMPLE 26

*6 - Chloro - O - Carbomethoxymethyl - 3,4 - Dihydro-2H - 1,2,4 - Benzothiadiazine - 7 - Sulfohydroxamic Acid 1,1-Dioxide*

2 g. of 6 - chloro - O - carboxymethyl - 3,4 - dihydro-

2H - 1,2,4 - benzothiadiazine - 7 - sulfohydroxamic acid 1,1-dioxide was dissolved in 4 cc. dimethylformamide. To the solution was added 40 cc. of methanol saturated with hydrogen chloride. After standing overnight at 0°, the mixture was poured into excess ice-water. The white precipitate, 6 - chloro - O - carbomethoxymethyl-3,4 - dihydro - 2H - 1,2,4 - benzothiadiazine - 7 - sulfohydroxamic acid 1,1-dioxide, was filtered off and recrystallized from acetone-water, M.P. 198–199° C. (dec.).

EXAMPLE 27

*6 - Chloro - O - Carbethoxymethyl - 2H - 1,2,4 - Benzothiadiazine-7-Sulfohydroxamic Acid 1,1-Dioxide*

3 g. of 6-chloro-O-carboxymethyl-2H-1,2,4-benzothiadiazine-7-sulfohydroxamic acid 1,1-dioxide was dissolved in 5 cc. dimethylformamide. To the solution was added 45 cc. of ethanol saturated with hydrogen chloride. After standing at 0° overnight, the mixture was poured into excess ice-water. The white precipitate, 6-chloro-O-carbethoxymethyl - 2H - 1,2,4 - benzothiadiazine - 7-sulfohydroxamic acid 1,1-dioxide, was filtered off and recrystallized from acetone-water, M.P. 226–227° C. (dec.).

EXAMPLE 28

*6 - Chloro - O - Carbethoxymethyl - 3,4 - Dihydro - 2H-1,2,4 - Benzothiadiazine - 7 - Sulfohydroxamic Acid 1,1-Dioxide*

2 g. of 6 - chloro - O - carboxymethyl - 3,4 - dihydro-2H - 1,2,4 - benzothiadiazine - 7 - sulfohydroxamic acid 1,1-dioxide was dissolved in 4 cc. dimethylformamide. To the solution was added 40 cc. of ethanol saturated with hydrogen chloride. After standing overnight at 0°, the mixture was poured into excess ice-water. The white precipitate, 6 - chloro - O - carbethoxymethyl - 3,4 - dihydro - 2H - 1,2,4 - benzothiadiazine - 7 - sulfohydroxamic acid 1,1-dioxide, was filtered off and recrystallized from acetone-water, M.P. 185–187° C. (dec.).

EXAMPLE 29

*2-Chloro-4-Amino-5-Sulfamyl-O-Methyl-Benzenesulfohydroxamic Acid*

39 g. of crude 6-chloro-O-methyl-2H-1,2,4-benzothiadiazine-7-sulfohydroxamic acid 1,1-dioxide was dissolved in 350 cc. of 1 N sodium hydroxide and the solution was refluxed for 1 hour. It was then treated with charcoal, filtered, cooled and added slowly, under ice-cooling, to 120 cc. of hydrochloric acid (1:3). The precipitated material was filtered off, washed with water, and dried in vacuo at 50°. The 2-chloro-4-amino-5-sulfamyl-O-methylbenzenesulfohydroxamic acid was recrystallized from acetone-water, M.P. 192–193° C.

*6-Chloro-3,4-Dihydro-O-Methyl-2H-1,2,4-Benzothiadiazine-7-Sulfohydroxamic Acid 1,1-Dioxide*

29 g. of crude 2-chloro-4-amino-5-sulfamyl-O-methylbenzenesulfohydroxamic acid was dissolved in 75 cc. of ethanol. The solution was heated to reflux with stirring, and to the hot solution was added slowly 1.5 cc. of 40% sodium hydroxide solution, followed by 7.25 cc. of 37% formaldehyde solution. After the addition was completed, the mixture was refluxed for one hour, during which time a copious amount of solid material precipitated. After cooling, 120 cc. of ice-water was added, and the mixture was chilled for a few hours. The precipitate was filtered off, washed with water and dried in vacuo at 50°. After recrystallization from acetone-water with the aid of charcoal, the crystalline product, 6-chloro-3,4-dihydro-O-methyl-2H-1,2,4-benzothiadiazine-7 - sulfohydroxamic acid 1,1-dioxide, melted at 217–219° C.

EXAMPLE 30

*Sodium Salt of 6-Chloro-O-Carboxymethyl-3,4-Dihydro-2H-1,2,4-Benzothiadiazine-7-Sulfohydroxamic Acid 1,1-Dioxide*

0.5 g. of 6-chloro-O-carboxymethyl-3,4-dihydro-2H-1,2,4-benzothiadiazine-7-sulfohydroxamic acid 1,1-dioxide was suspended in 1.35 cc. of 1 N aqueous sodium hydroxide. 2.65 cc. of water was added and the mixture was warmed to 50° for a few minutes. A clear solution was obtained. After chilling for 24 hours, crystals precipitated from the solution. The crystals were separated by filtration and dried in vacuo. The white crystals of the sodium salt melted at 262–264° C. (dec.).

We claim:
1. A compound selected from the group consisting of those having the formulae:

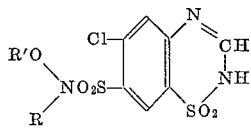

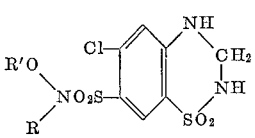

and their pharmaceutically acceptable salts, wherein R is a member of the group consisting of hydrogen and lower alkyl and R' is a member of the group consisting of hydrogen, lower alkyl, lower alkenyl, lower alkynyl, carboxy-lower alkyl and carbo-lower alkoxy-lower alkyl.

2. A compound of the formula

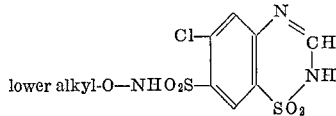

3. A compound of the formula

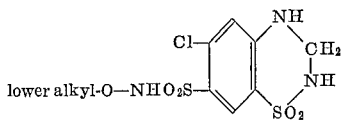

4. A compound of the formula

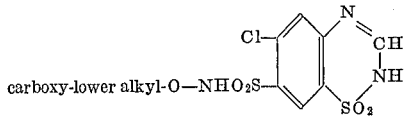

5. A compound of the formula

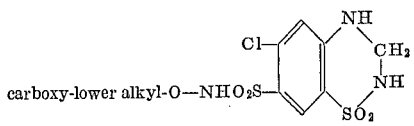

6. 6-chloro-O-methyl-2H-1,2,4-benzothiadiazine-7-sulfohydroxamic acid 1,1-dioxide.

7. 6-chloro-3,4-dihydro-O-methyl-2H-1,2,4-benzothiadiazine-7-sulfohydroxamic acid 1,1-dioxide.

8. 6-chloro-O-carboxymethyl-2H - 1,2,4 - benzothiadiazine-7-sulfohydroxamic acid 1,1-dioxide.

9. 6-chloro-3,4-dihydro-O - carboxymethyl - 2H - 1,2,4-benzothiadiazine-7-sulfohydroxamic acid 1,1-dioxide.

References Cited in the file of this patent

Wagner et al.: Synthetic Organic Chemistry, pages 822–3 (1953).

De Stevens et al.: Experientia, volume 14, page 463 (1958).